United States Patent [19]
Liechti et al.

[11] 3,972,676
[45] Aug. 3, 1976

[54] EXHAUST PROCESS FOR THE DYEING OF SYNTHETIC ORGANIC TEXTILE MATERIAL

[75] Inventors: Hans Wilhelm Liechti, Oberwil; Raymond Defago, Reihen, both of Switzerland

[73] Assignee: Ciba-Geigy Corporation, Ardsley, N.Y.

[22] Filed: May 6, 1974

[21] Appl. No.: 467,044

[30] Foreign Application Priority Data
May 9, 1973 Switzerland.......................... 6539/73
Mar. 28, 1974 Switzerland.......................... 4360/74

[52] U.S. Cl. ...................................................... 8/26
[51] Int. Cl.² ........................................... C09B 27/00
[58] Field of Search ............................................ 8/26

[56] References Cited
UNITED STATES PATENTS

| | | | |
|---|---|---|---|
| 3,122,410 | 2/1964 | Mueller et al. ........................ | 8/26 X |
| 3,253,876 | 5/1966 | Wilcox et al. ........................... | 8/26 |
| 3,413,075 | 11/1968 | Rotcop et al. .......................... | 8/26 |

FOREIGN PATENTS OR APPLICATIONS

| | | | |
|---|---|---|---|
| 2,000,038 | 1/1970 | Germany ................................ | 8/26 |

*Primary Examiner*—William F. Hamrock
*Attorney, Agent, or Firm*—Joseph G. Kolodny; Edward McC. Roberts; Prabodh I. Almaula

[57] ABSTRACT

A process for the dyeing by the exhaust process of synthetic organic textile material in navy blue to black shades from halogenated hydrocarbons, which process comprises the use, for dyeing, of at least one disazo dyestuff of formula I

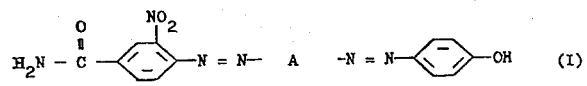 (I)

wherein A represents

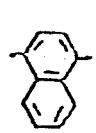 or 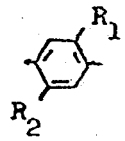

$R_1$ represents hydrogen, or an alkyl or alkoxy radical having 1 to 4 carbon atoms, and $R_2$ represents the same as $R_1$, or the -$CF_3$ group, in admixture with the monoazo dyestuff of formula II

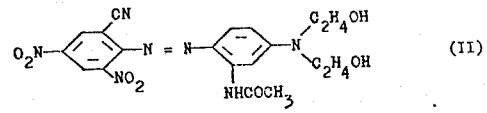 (II)

or with the anthraquinone dyestuff mixture of formula III

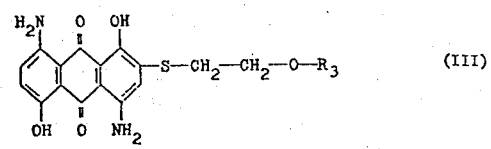 (III)

wherein $R_3$ represents a mixture of H and -$CH_2$-$CH_2$-$CH_2$-$CH_2$-OH, and when A in formula I represents

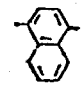

in addition to a small amount of the disazo dyestuff of formula IV

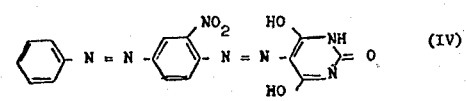 (IV)

or of formula V

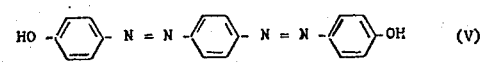 (V)

11 Claims, No Drawings

EXHAUST PROCESS FOR THE DYEING OF SYNTHETIC ORGANIC TEXTILE MATERIAL

The present invention relates to an exhaust process for the dyeing of synthetic organic textile material, particularly of fibre material made from linear, highly polymerised polyesters from halogenated hydrocarbons, in shades varying from navy blue to black, by application of a mixture of specific disperse dyestuffs, as well as to the synthetic organic textile material dyed by the new process.

The dyeing of synthetic organic textile material from an aqueous liquor in navy blue to black shades is known.

This mode of dyeing has the great disadvantage, however, that dark coloured waste liquors are left, the purification of which is very expensive and constitutes a problem which could not hitherto be satisfactorily solved. It is likewise known that synthetic organic textile material can be dyed from organic solvents or solvent mixtures. These dyeing processes, however, have been hitherto limited to the obtainment of light to medium shades of colour.

A process has now been found by which it is possible, with appreciable to partically complete exhaustion of the dyebath, to dye synthetic organic textile material, from halogenated hydrocarbons, evenly in dark navy blue to black shades, with excellent fastness to wet processing, sublimation, rubbing and light.

The new process comprises the use, for dyeing, of at least one disazo dyestuff of formula I

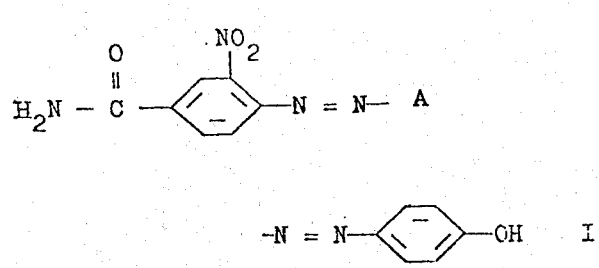

wherein A represents

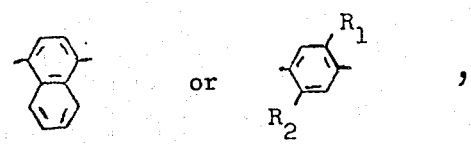

$R_1$ represents hydrogen, an alkyl radical having 1 to 4 carbon atoms, such as, for example, the methyl, ethyl, n-propyl, iso-propyl or tert.-butyl groups, or an alkoxy radical having 1 to 4 carbon atoms, such as, e.g. the methoxy, ethoxy, iso-propoxy or tert.-butoxy group, and $R_2$ represents the same as $R_1$ or the $-CF_3$ group, in admixture with the monoazo dyestuff of formula II

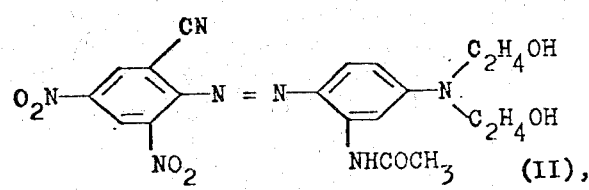

or with the anthraquinone dyestuff mixture of formula III

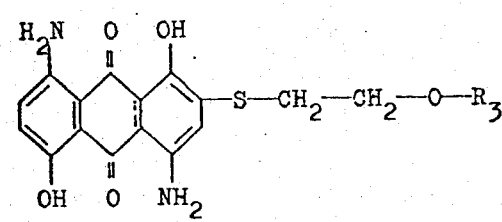

wherein $R_3$ represents a mixture of H and the $-CH_2-CH_2-S-CH_2-CH_2-OH$ group, and when A in formula I represents

in addition a small amount of the disazo dyestuff of formula IV

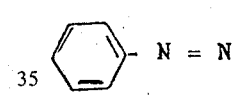

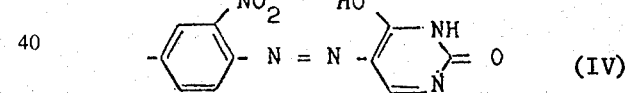

or of formula V

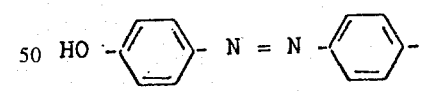

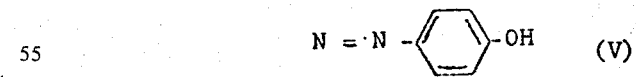

Advantageously, $R_1$ in formula I represents the methoxy group and $R_2$ the methyl group, and $R_3$ in formula III represents to the extent of ca. 70% hydrogen and to the extent of ca. 30% the $-CH_2-CH_2-S-CH_2CH_2OH$ group.

The disperse dyestuffs usable according to the invention of formulae I, II, III, IV and V are known and can be prepared by known processes.

By employing the dyestuff mixture according to the present invention, a higher dyestuff saturation of the fibre is attained than that attained by the individual dyestuffs, thus affording deeper navy blue to black shades. Suitable dye liquors for the process according to the invention are halogenated hydrocarbons, particularly halogenated lower aliphatic hydrocarbons, especially those having a boiling point of between 60° and 180°C, such as e.g. chloroform, carbon tetrachloride, dichloroethane, tetrachloroethane, perchloroethane, 1,1,2-trichloro-2,2,1-trifluoroethane, dibromoethylene, 1- or 2-chloropropane, dichloropropane, trichloropropane, chlorobutane, 1,4-dichlorobutane, 2-chloro-2-methylpropane or dichlorohexane, or aromatic chlorinated or fluorinated hydrocarbons, such as chlorobenzene, fluorobenzene, chlorotoluene and benzotrifluoride. Especially valuable are chlorinated hydrocarbons boiling between 70° and 130°C, such as trichloroethylene, 1,1,1-trichloroethane and, in particular, tetrachloroethylene ("perchloroethylene"). Also suitable are mixtures of the halogenated hydrocarbons mentioned.

The dyestuffs of formulae I, II, III, IV and V, to be used according to the invention, are very difficultly soluble in halogenated hydrocarbons. It is therefore advisable to use them in the organic dye liquor, singly or together, at least partially in the dispersed state, and with a particle size of below 5 $\mu$, preferably of between 0.1 and 3 $\mu$. The fine dispersion of the dyestuffs can be effected by known methods, e.g. by mechanical pulverising of the dyestuffs together with a dispersing agent and a carrier substance, e.g. a highly viscous compound, advantageously paraffin oil, or phthalic acid diesters such as phthalic acid dimethyl ester, or with other discarboxylic acid esters, in a kneading apparatus for example, preferably, however, in a mill. Ball mills or sand mills are particularly suitable for this purpose.

Suitable dispersing agents are commercial anionic, cationic, ampholytic and, in particular, non-ionic surface active agents, which are advantageously soluble in the organic dye liquor, but which do not solubilise the dyestuff or the dyestuff mixture. Especially suitable dispersing agents are, for example: oxazolines, cellulose derivatives, higher fatty acids or salts of higher fatty acids, e.g. cobalt stearate or aluminium tripalmitate; high-molecular condensation products of polypropylene with ethylene oxide having molecular weights of 500 to 7000 or polywaxes, e.g. Pluronic P 104 (Wyandotte USA), molecular weight ca. 5500; addition products of alkylene oxides, particularly ethylene oxide, with higher fatty acids, fatty amides, aliphatic alcohols, mercaptans, amines, or with alkylphenols the alkyl radicals of which contain at least 7 carbon atoms; esters of polyalcohols, especially mono- or diglycerides of fatty acids, e.g. monoglycerides of lauric, stearic, palmitic or oleic acid, as well as the fatty acid esters of sugar alcohols, such as sorbitol, sorbitans and saccharose, for example, sorbitan monolaurate (Span 20), sorbitan palmitate (Span 40), sorbitan stearate (Span 60), sorbitan oleate (Span 80), sorbitan sesquioleate, sorbitan trioleate (Span 85), or their oxethylation products; and, finally, also quaternary ammonium salts such as dodecylammonium acetate or cetylpyridinium acetate, or quaternated alkylammonium polyglycol ethers such as are described in the Swiss Pat. No. 409,941, sapamines such as Sapamin CH, KW, MS or OC, polydiene resins, fatty acid amides, or substances containing the amide groups in ring form, as in the case of the derivatives of polyvinylpyrrolidone which are obtainable commercially, e.g. under the name of "Antaron V 216 and V 220", and have a molecular weight of about 7000 to 9000.

The amounts in which the dyestuff mixture as defined is used in the dye baths can vary depending on the desired depth of colour; in general, amounts of 1.5 to 10 per cent by weight, relative to the material being dyed, have proved advantageous. In order to obtain the desired deep navy blue to black shades, the dyestuffs of formula II or III are used advantageously in excess in proportion to the dyestuff of formula I: particularly at least one and a half times the amount is used. The amount of disazo dyestuff of the formula IV or V to be added depends on the desired shade and advantageously varies from about 0.5 to 10% by weight of the total amount of dyestuff, preferably from 1 to 7 % by weight.

The process according to the invention is suitable for the dyeing of synthetic organic textile materials of various types by the exhaust process. These are, in particular, fibre materials made from linear, highly polymerised polyesters, such as polyethylene glycol terephthalate, polycyclohexane-dimethylene-terephthalate and ethylene glycol, or copolyether ester fibres made from p-hydroxybenzoic acid, terephthalic acid and ethylene glycol. The fibre materials can be in the most varied stages of processing; e.g., they can be treated as textured filaments, flock, slubbing or yarn, or as piece goods such as fabrics or knitted goods, or as ready made articles.

It has been shown to be particularly advantageous in dyeing with the dyestuff mixtures according to the invention that the addition of water can be completely dispensed with, a factor which, among other things, greatly facilitates regeneration of the exhausted dye baths.

The process according to the invention, which is preferably performed in closed, pressure-tight apparatus, e.g. in circulation apparatus, jet machines, winch-dyeing machines, drum dyeing machines, vats, paddle-dyeing machines or cheese dyeing machines, can be carried out, for example, as follows: The material to be dyed is placed into the halogenated hydrocarbon at room temperature with a ratio of goods to liquor of about 1:3 to 1:40, preferably 1:5 to 1:20; the dyestuffs are advantageously added to the liquor in a finely dispersed form and may be used individually or in a ready-made mixture; the dyebath is then heated to 100°C, advantageously to between 120° and 150°C, and maintained at this temperature for about 5 to 120 minutes, advantageously for 15 to 45 minutes. After obtainment of the desired depth of colour, or on complete exhaustion of the dye bath, the bath is cooled, the dyed material removed from the bath and, after rinsing, e.g. by treating twice with perchloroethylene and optionally a detergent for 5 minutes at 85°C, optionally dried, advantageously in vacuo with aqueous saturated steam for ca. 10 minutes.

By means of the process according to the invention, synthetic organic textile material can be evenly dyed in a simple manner from halogenated hydrocarbons, with the obtainment of high dyestuff yields and excellent fastness properties, in the desired navy blue to black shades. Particularly on textured polyester, there are obtained, even, deeply coloured, navy blue to black dyeings having a high level of fastness to sublimation, good fastness to wet processing, light and rubbing, and a good equalisatin of differences of affinity arising from the material, without impairment of the physical properties of the fibres.

The use of organic dye liquors as the dye bath, instead of water, offers a number of advantages: the exhaustion of the dye bath in the solvent exhaust process is more rapid and efficient than that in aqueous media, thus resulting in shorter dyeing times; furthermore, the organic dye liquor can be easily recovered, e.g. by passage through an active-charcoal filter, in consequence of which the ever increasing difficulties in the treatment of waste liquors are completely avoided. The cleansed and recovered dye liquors can be used afresh to an unlimited extent as organic dye liquors. It is moreover possible by means of the process according to the invention, provided that the appropriate equipment is available, to dye synthetic organic material, in the most diverse stages of processing, in a gentle manner and without formation of contaminated water, with excellent dye yields. By virtue of good bath exhaustion, a reductive aftercleansing of the dyed material is in most cases unnecessary.

The following examples serve to illustrate the invention without the scope of this being limited by them. The temperatures in the examples are expressed in degress Centigrade.

EXAMPLE 1

10 g of textured polyethylene glycol terephthalate fabric are placed, with a ratio of goods to liquor of 1:10, at room temperature into a dye bath, located in a closable dye apparatus, which has been prepared by the dispersion of 0.5 g of a stock dispersion a) containing 0.025 g of the dye-stuff of the formula

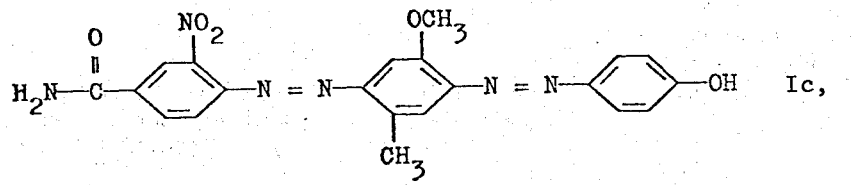

0.01 g of Antaron V 216 (polyvinylpyrrolidone derivative, molecular weight ca. 7000) and 0.465 g of paraffin oil, and 1.5 g of a second stock dispersion b) consisting of 0.15 g of the dyestuff of the formula

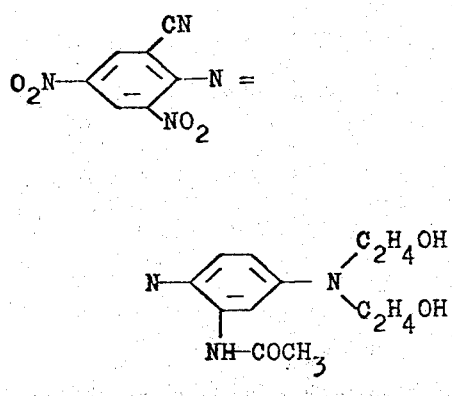

0.6 g of Antaron V 216 and 1.29 g of paraffin oil, in 98 ml of tetrachloroethylene. The dyeing apparatus is then closed and the dyebath heated, with continuous movement of the material being dyed, in the course of 10 minutes to 121°, and subsequently maintained for 60 minutes at the boiling point of the tetrachloroethylene. After cooling to 80°, the dyed fabric is removed, squeezed out to leave the least possible amount of residual liquor in the material, rinsed by heating with tetrachloroethylene containing 0.25% of hexamethylphosphoric acid triamide, with a goods-to-liquor ratio of 1:8, in the above mentioned apparatus for 5 minutes, again rinsed with tetrachloroethylene at 80° for 5 minutes, and subsequently dried. The liquor remaining behind is practically colourless.

There is obtained in this manner on textured polyethylene glycol terepthalate fabric a deeply coloured, even navy blue dyeing having excellent fastness to sublimation, light, wet processing and rubbing.

The stock dispersions used in Example 1 are obtained as follows: stock dispersion a) 30 g of the dyestuff of formula Ic given in Example 1 is ground with 12 g of Antaron V 216 and 500 g of paraffin oil in a bead (ball) mill until the particle size of the dyestuff is below 3 $\mu$. The grinding agent is removed to leave a liquid 5% dyestuff preparation; stock dispersion b) 45 g of the dyestuff of formula II given in Example 1 is ground with 18 g of Antaron V 216 and 387 g of paraffin oil in a bead (ball) mill until the particle size of the dyestuff is below 3 $\mu$. The grinding agent is removed to leave a liquid 10% dyestuff preparatin.

EXAMPLE 2

If, instead of the stock dispersion b) in Example 1, there are used 0.6 g of a stock dispersion c) containing 0.18 g of a dyestuff of the formula

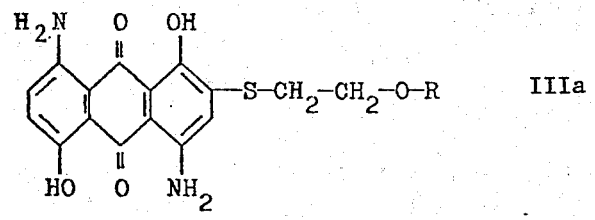

wherein R represents ca. 70% of H and ca. 30% of —CH$_2$CH$_2$-S-CH$_2$-CH$_2$-OH, 0.18 g of Antaron V 216 and 0.24 g of paraffin oil, and 2.0 g of the stock dispersion a) described in Example 1, which together are dispersed in 97.4 ml of tetrachloroethylene, the procedure otherwise being as described in Example 1, then there is obtained on textured polyethylene glycol terephthalate a deeply coloured, even black dyeing having excellent fastness to sublimation, light, wet processing and rubbing.

The stock dispersion c) is prepared as follows:
54 g of the dyestuff mixture of formula IIIa given in Example 2 is ground with 54 g of Antaron V 216 and 72 g of paraffin oil in a bead (ball) mill until the particle size is smaller than 3 $\mu$. The grinding agent is removed to leave a liquid 30% dyestuff preparation. If in the procedure of Examples 1 and 2, the following dyestuffs ae used in place of the dyestuff of formula IC together with the dyestuff of formula II or IIIa, deeply coloured, level navy blue and black dyeings are also obtained on polyester material.

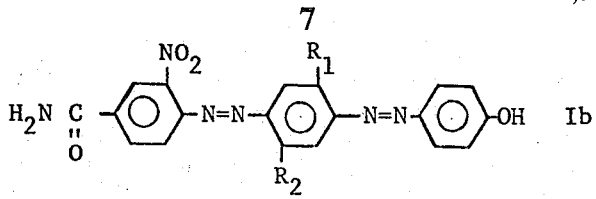

| Ex. No. | R₁ | R₂ |
|---|---|---|
| 3 | —OCH₃ | —OCH₃ |
| 4 | —OC₂H₅ | —OC₂H₅ |
| 5 | —OC₂H₅ | —CH₃ |
| 6 | —CH₃ | —CH₃ |
| 7 | —H | —OCH₃ |
| 8 | —OCH₃ | —CF₃ |

EXAMPLE 9

10 g. of textured polyethylene glycol terephthalate fabric are placed, with a ratio of goods to liquor of 1:10, at room temperature into a dye bath, located in a closable dye apparatus, which has been prepared by the dispersion of 0.5 g of a stock dispersion d) containing 0.025 g of the dyestuff of the formula

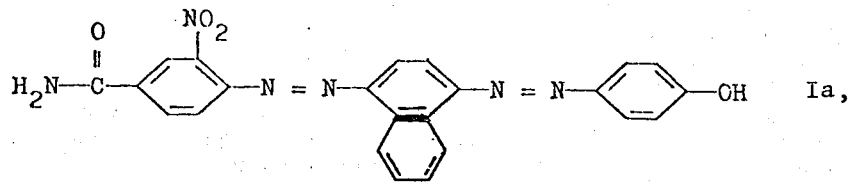

0.01 g of Antaron V 216 and 0.465 g of paraffin oil, and 1.5 g of the stock dispersion b) given in Example 1, consisting of 0.15 g of the dyestuff of the formula

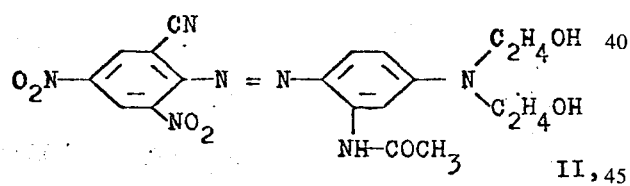

0.6 g of Antaron V 216 and 1.29 g of paraffin oil, and in addition of 0.02 g of a third stock dispersion e) containing 0.0067 g of the dyestuff of the formula

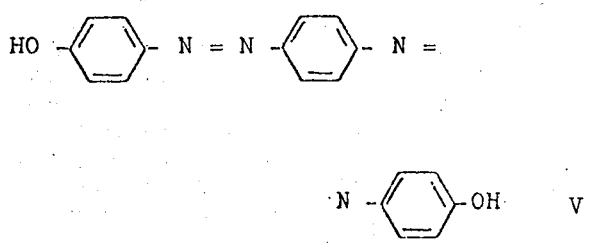

0.0067 g of Antaron V 216 and 0.0112 g of paraffin oil, in 98 ml of tetrachloroethylene.

The dyeing apparatus is then closed and the dyebath heated, with continuous movement of the material being dyed, in the course of 10 minutes to 121°, and subsequently maintained for 60 minutes at the boiling point of the tetrachloroethylene.

After cooling to 80°, the dyed fabric is removed, squeezed out to leave the least possible amount of residual liquor in the material, rinsed by heating to 80° with tetrachloroethylene containing 0.5% of hexamethylphosphoric acid triamide, with a goods-to-liquor ration of 1:10, in the above mentioned apparatus for 5 minutes, again rinsed with tetrachloroethylene at 80° for 5 minutes, and subsequently dried. The liquor remaining behind is practically colourless.

There is obtained in this manner on textured polyethylene glycol terephthalate fabric a deeply coloured, even navy blue dyeing having excellent fastness to sublimation, light, wet processing and rubbing.

The stock dispersions used in Example 9 are obtained as follows:

stock dispersion d) was prepared in the same manner as stock dispersion a) using 30 g of the dyestuff of formula Ia given in Example 9 in place of 30 g of the dyestuff of formula Ic given in Example 1.

stock dispersion e) was prepared in the same manner as stock dispersion c) given in Example 2, using 54 g of the dyestuff of formula V given in Example 9 in place of 54 g of the dyestuff mixture of the formula IIIa given in Example 2.

EXAMPLE 10

If, instead of the stock dispersion b) in Example 9, there are used 0.6 g of the stock dispersion c) given in Example 2 containing 0.18 g of a dyestuff of the formula

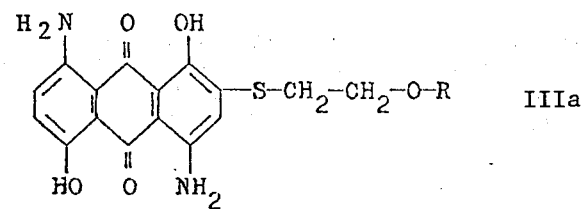

wherein R represents ca. 70% of H and ca. 30% of —CH₂CH₂-S-CH₂-CH₂-OH.

0.18 g of Antaron V 216 and 0.24 g of paraffin oil, and 1.5 g of the stock dispersion d) given in Example 9, together with 0.02 g of the stock dispersion e) given in Example 9 dispersed in 97.9 ml of tetrachloroethylene, the procedure otherwise being as described in Example 9, then there is also obtained on textured polyethylene glycol terephthalate a deeply coloured, even navy blue dyeing having excellent fastness to sublimation, light, wet processing and rubbing.

EXAMPLE 11

If, instead of the stock dispersion e) given in Example 10 0.05 g of the stock dispersion f) containing 0.015 g of a dyestuff of the formula IV

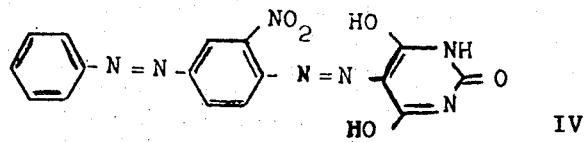

0.015 g Antaron V 216 and 0.02 g of paraffin oil is employed, the procedure otherwise being as described in Example 10, then there is also obtained on textured polyethylene glycol terephthalate a deeply coloured, even navy blue dyeing having excellent fastness to sublimation, light, wet processing and rubbing. The stock dispersion f) is prepared in the same manner as stock dispersion c) given in Example 1, using 54 g of the dyestuff of formula IV in place of 54 g of the dyestuff mixture of formula IIIa given in Example 2.

EXAMPLE 12

10 g of textured polyethylene glycol terephthalate fabric are placed, with a ratio of goods to liquor of 1:10, at room temperature into a dye bath, located in a closable dye apparatus, which has been prepared by the dispersion of 1.4 g of a stock dispersion (d) given in Example 9 containing 0.07 g of the dyestuff of the formula Ia given in Example 9, 0.01 g of Antaron V 216 and 0.465 g of paraffin oil, and 1.5 g of a second stock dispersion (b) consisting of 0.15 g of the dyestuff of the formula II given in Example 9, 0.6 g of Antaron V 216 and 1.29 g of paraffin oil, and in addition 0.1 g of the stock dispersion (e) given in Example 9 containing 0.03 g of the dyestuff of the formula V given in Example 9, 0.03 g of a Antaron V 216 and 0.04 g of paraffin oil, in 97.1 ml of tetrachloroethylene. The procedure of Example 9 is followed to obtain on textured polyethylene glycol terephthalate fabric a deeply coloured, even black dyeing having excellent fastness to sublimation, light, wet processing and rubbing.

EXAMPLE 13

If the procedure of Example 12 is followed, but using the following dyestuff dispersions:

1 g of the stock dispersion (d) given in Example 9 containing 0.05 g of the dyestuff of formula Ia, 0.6 g of the stock dispersion (c) given in Example 2 containing 0.18 g of the dyestuff mixture of formula IIIa, and 0.1 g of the stock dispersion (e) given in Example 9 containing 0.03 g of formula V given in Example 9, then there is obtained on textured polyethylene glycol terephthalate a deeply coloured, even black dyeing having excellent fastness to sublimation, light, wet processing and rubbing.

We claim:
1. A process for dyeing synthetic organic textile material in navy blue to black shades, by the exhaust process, from halogenated hydrocarbons, which process comprises the use of at least one disazo dyestuff of formula I

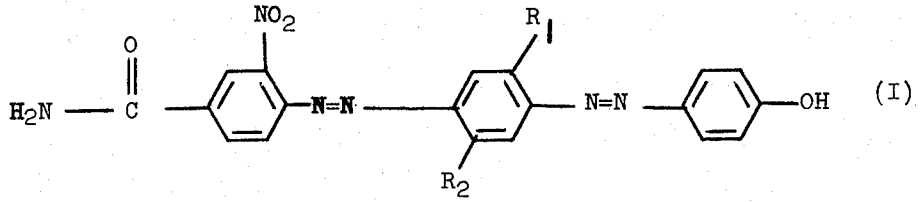

where
$R_1$ is hydrogen, or an alkyl or alkoxy radical having 1 to 4 carbon atoms, and
$R_2$ is hydrogen or an alkyl or alkoxy radical having 1 to 4 carbon atoms, or trifluoromethyl in admixture with the monoazo dyestuff of formula II

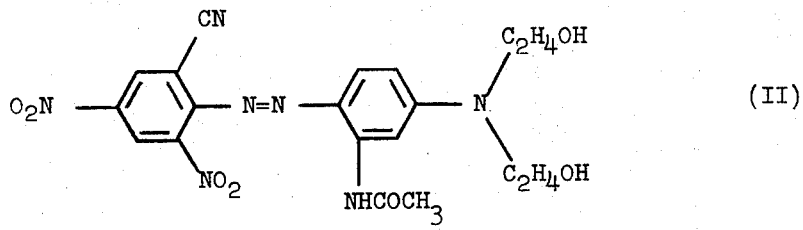

2. Process according to claim 1, wherein the dyestuff of formula II is employed in an amount of at least one and a half times the amount of the dyestuff of formula I.

3. Process according to claim 1, wherein the employed halogenated hydrocarbon is a halogenated, lower aliphatic hydrocarbon.

4. Process according to claim 1, wherein the employed halogenated hydrocarbon is a chlorinated hydrocarbon boiling between 70° and 130°C, particularly tetrachloroethylene.

5. Process according to claim 1, comprising the use of finely dispersed dyestuffs, having a particle size of below 5 $\mu$.

6. Process according to claim 1, wherein dyeing is performed at temperatures of from 100 to 150°C, preferably from 120 to 150°C.

7. Process according to claim 1, wherein the employed synthetic organic textile material is fibre material made from linear, high-molecular esters of aromatic polycarboxylic acids with polyfunctional alcohols.

8. Process according to claim 7, wherein polyethylene glycol terephthalate fibres are used.

9. A dyestuff preparations for carrying out the process according to claim 1, comprising a dyestuff mixture consisting of dyestuffs of formulae I and II, formulae having a particle size of below 5 $\mu$, together with dispersing agent and carrier.

10. A dyestuff preparations according to claim 9, which contains polyvinylpyrrolidone derivatives as dispersing agent, and paraffin oil as carrier.

11. The synthetic organic textile material, particularly polyester material, dyed in navy blue to black shades according to the process of claim 1.

* * * * *

UNITED STATES PATENT AND TRADEMARK OFFICE
CERTIFICATE OF CORRECTION

PATENT NO. : 3,972,676
DATED : August 3, 1976
INVENTOR(S) : HANS WILHELM LIECHTI ET AL It is certified that error appears in the above—identified patent and that said Letters Patent are hereby corrected as shown below:

In claim 9, column 10, line 60, "preparations" should read -- preparation --; and in lines 62-63, "formu-lae" should be deleted.

Signed and Sealed this

Sixth Day of November 1979

[SEAL]

Attest:

RUTH C. MASON
Attesting Officer

LUTRELLE F. PARKER
Acting Commissioner of Patents and Trademarks